(12) United States Patent
Aonuma

(10) Patent No.: US 7,281,982 B2
(45) Date of Patent: Oct. 16, 2007

(54) TARGETING SYSTEM

(75) Inventor: Eiji Aonuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 746 days.

(21) Appl. No.: 10/727,503

(22) Filed: Dec. 5, 2003

(65) Prior Publication Data

US 2004/0110560 A1 Jun. 10, 2004

(30) Foreign Application Priority Data

Dec. 5, 2002 (JP) ............................. 2002-353656

(51) Int. Cl.
*A63F 9/24* (2006.01)
(52) U.S. Cl. ................... 463/32; 463/2; 463/5; 463/30; 463/31
(58) Field of Classification Search ................ 434/2–4, 434/17–19, 27; 463/2, 5, 33, 36, 49–53
See application file for complete search history.

(56) References Cited

U.S. PATENT DOCUMENTS 6,267,674 B1 * 7/2001 Kondo et al. .................. 463/32
6,283,861 B1 * 9/2001 Kawai et al. .................. 463/43
6,352,476 B2 * 3/2002 Miyamoto et al. ............. 463/32

FOREIGN PATENT DOCUMENTS

JP 11-259686 9/1999
JP 2000-84242 3/2000

OTHER PUBLICATIONS

The Legend of Zelda: Ocarina of Time, Instruction Booklet, Copyright 1998.*
"PlayStation (R) Kanzen-Koryaku series (85), Daisenryaku Master Combat official guidebook, first edition", Futaba Publishers Ltd., Jan. 20, 1999, 1st Edition, p. 12 (partial translation).
"Sonic Adventure navigation guide, first edition", Softbank Corp., Mar. 16, 1999, 1st Edition, p. 99 (partial translation).
"The PlayStation BOOKS, chase the express perfect guide, first edition" Softbank Publishing Ltd., Mar. 2, 2000, 1st Edition, p. 12 (partial translation).

* cited by examiner

*Primary Examiner*—Ronald Laneau
*Assistant Examiner*—David Duffy
(74) *Attorney, Agent, or Firm*—Nixon & Vanderhye P.C.

(57) ABSTRACT

In a video graphics game apparatus, a game operation controller device is used to select at least one of a plurality of items which are accessible by a player object to use as throwable items. A target object specifier is used to specify an object existing in a direction in which a throwable item is to be thrown. The effectiveness of the throwable item on the target object is determined based on stored item/object correspondence information defining which throwable item is effective on which object on an item-by-item basis. A game display controller provides an aiming point on the display indicating a direction in which the throwable item is to be thrown, the aiming point being displayed in a manner or mode that is varied depending upon a result of the correspondence determination.

13 Claims, 17 Drawing Sheets

FIG. 7

CORRESPONDENCE INFORMATION

| ITEM | SHOOTING RANGE | CORRESPONDING OBJECT |
|---|---|---|
| ROPE | 10 | FIRST OBJECT |
| HOOK | 15 | FIRST OBJECT |
| | | SECOND OBJECT |
| BOOMERANG | 30 | THIRD OBJECT |
| ⋮ | ⋮ | ⋮ |

CORRESPONDENCE INFORMATION

| ITEM | SHOOTING RANGE | CORRESPONDING OBJECT |
|---|---|---|
| ROPE | 10 | FIRST TRANSPARENT OBJECT |
| HOOK | 15 | SECOND TRANSPARENT OBJECT |
| | | THIRD TRANSPARENT OBJECT |
| BOOMERANG | 30 | SECOND TRANSPARENT OBJECT |
| ⋮ | ⋮ | ⋮ |

TARGETING SYSTEM

BACKGROUND OF THE INVENTION

1. Field of the Invention

The illustrative non-limiting implementation disclosed herein relates to a game apparatus which displays a game space. More particularly, the exemplary implementation disclosed herein relates to a game apparatus which displays an aiming point on a game screen, the aiming point being displayed when throwing a selected item towards an object in the game space.

2. Description of the Background Art

Games, in which an aiming point is displayed on a game screen, e.g., shooting games, are presently known in the art of computer video graphics games. In such a game, a player is able to take aim at an enemy character by aligning an aiming point displayed on the game screen with the enemy character. This makes it easier for the human player to shoot the displayed enemy character.

There is a class of shooting games which not only display an aiming point on a game screen but also change the displayed mode (e.g., appearance) of the aiming point depending on whether the aiming point is properly overlapping an enemy character or not (see Japanese Patent Laid-Open Publication No. 11-259686). This permits the player to know in advance whether a shot which he or she is going to make will actually hit the enemy character, and thus ensures more successful shooting.

Another conventional technique is disclosed in Japanese Patent Laid-Open Publication No. 2000-84242.

In a shooting game of the above kind, where there is only one item (e.g., a gun) to be used by the player, there is no disadvantage in changing the displayed mode of the aiming point based solely on whether the aiming point is properly overlapping an enemy character or not. However, in a game which allows the player to select one of a plurality of items (e.g., a rope, a hook, and a boomerang) and throw the selected item at an object (e.g., an enemy character, a tree, etc.), such that different items will be effective on different objects, it may add to the confusion of the player if the displayed mode or appearance of the aiming point is changed based solely on whether the aiming point is overlapping an object or not.

More specifically, if the player has selected a rope (i.e., an item to be thrown at a branch of a tree which the player wishes to climb up) and the aiming point happens to overlap an enemy character which has suddenly emerged, the displayed mode of the aiming point will transition to that which indicates successful targeting. Then, surprised by the sudden appearance of the enemy character, the player may impulsively throw the rope at the enemy character based on the indication of successful targeting, before being able to change the item from the rope to (e.g., a boomerang) an item to be thrown at an enemy character with which the player wishes to attack. This might possibly invite a disadvantageous situation.

SUMMARY OF THE INVENTION

Therefore, at least one aspect of the illustrative exemplary non-limiting implementation of a game apparatus disclosed herein is to provide a game apparatus for realizing a game which allows the player to select one of a plurality of items to be thrown at an object, such that the player is allowed to recognize whether the item will be effective on the object before throwing the item.

Accordingly, the exemplary game apparatus implementation disclosed herein is provided with at least one or more of the following features to attain the object mentioned above. The reference numerals or the like indicated below in parentheses are merely provided to help promote a better understanding of the implementations illustrated and disclosed herein in light of the more detailed descriptions later provided, and are not of any limitative nature.

A first aspect of the present invention is directed to a game apparatus for displaying an aiming point on a game screen, the aiming point being for use when an item to be used in a game is thrown at an object in a game space, comprising: an object deployment means (the CPU 201 executing step S102), an operation means (50) to be operated by a player, a throwable item selection means (the CPU 201 executing step S204), a target object specifying means (the CPU 201 executing step S302), a correspondence information storing means (205), a determination means (the CPU 201 executing step S303), and a display control means (the CPU 201 executing steps S103 and S109). The object deployment means deploys in a three-dimensional space a plurality of objects to be displayed, the plurality of objects including a player object. The throwable item selection means selects, in accordance with an operation made to the operation means, one of a plurality of items which are selectable by the player object as throwable items. Note that a "throwable item" is not limited only to an item to be thrown at a target but also includes an item to be shot, e.g., from a gun. The target object specifying means specifies as a target object an object existing in a direction in which the throwable item is to be thrown. The correspondence information storing means stores correspondence information (FIG. 7) defining which throwable item is effective on which object on an item-by-item basis. The determination means determines the effectiveness of the throwable item on the target object based on the correspondence information. The aiming point data generation means generates aiming point data to be used for displaying an aiming point indicating the direction in which the throwable item is to be thrown, the aiming point being displayed in a display mode (a first or second aim object) which is varied depending on a determination result by the determination means. The display control means performs display control so that the plurality of objects deployed by the object deployment means are displayed on the game screen as three-dimensional images; the aiming point is displayed so as to overlap the target object based on the aiming point data; and thereafter the throwable item appears thrown at the aiming point in response to an operation made to the operation means. Thus, the player is allowed to recognize whether the throwable item will be effective on the target object before actually throwing the item.

In a second aspect based on the first aspect, a transparent object is placed (FIG. 22) in a neighborhood of at least one object (e.g., a tree) in the game space displayed on the game screen, the transparent object being visually unrecognizable to the player. The target object specifying means specifies as the target object one of the transparent objects that is located in the direction in which the throwable item is to be thrown. The correspondence information storing means stores correspondence information (FIG. 24) defining which throwable item is effective on which transparent object on an item-by-item basis. Thus, it is possible to designate an arbitrary portion which a throwable item will be effective on, regardless of the number of objects displayed on the game screen or the shape of the displayed objects.

In a third aspect based on the first aspect, the game apparatus further comprises positional a relationship calculation means (the CPU 201 executing step S305) for calculating a positional relationship between the player object and the target object. The determination means determines the effectiveness based on the correspondence information (S303) as well as an effective range (FIG. 7) which is defined for each item and a calculation result by the positional relationship calculation means (S306). Thus, before actually throwing the item, the player is allowed to recognize whether the target object is located in the effective range which is defined for each throwable item.

In a fourth aspect based on the third aspect, the positional relationship calculation means calculates a distance from the player object to the target object, and the determination means determines the effectiveness based on the correspondence information as well as a shooting range which is defined for each item and the calculation result by the positional relationship calculation means. Thus, before actually throwing the item, the player is allowed to recognize whether the target object is located in the shooting range which is defined for each throwable item.

In a fifth aspect based on the first aspect, the game apparatus further comprises a marking means (e.g., CPU 201 executing step S403) for marking the target object in response to an operation made to the operation means, assuming that the determination means determines that the throwable item is effective upon the target object. The display control means controls (S504, S505) a trajectory of the throwable item so that the throwable item hits the target object as marked by the marking means. Thus, only the object which the throwable item will be effective upon is "locked-on", whereas any object which the throwable item will not be effective upon is not "locked-on", ensuring that the throwable item will hit the "locked-on" object without fail.

In a sixth aspect based on the fifth aspect, if a plurality of target objects are marked by the marking means, the display control means controls (S505) the trajectory of the throwable item so that the throwable item hits all of the marked target objects. Thus, it can be ensured that the throwable item will hit a plurality of objects which the throwable item will be effective upon, without fail.

The various, features, aspects and advantages discussed above of the one or more illustrative exemplary non-limiting implementations disclosed herein will become more apparent from the following detailed descriptions when taken in conjunction with the accompanying drawings.

BRIEF DESCRIPTION OF THE DRAWINGS

FIG. 7 is a table showing correspondence information;

DESCRIPTION OF THE PREFERRED EMBODIMENTS

Hereinafter, an illustrative exemplary non-limiting implementation of the game apparatus will be described with reference to the figures.

Figure 1:
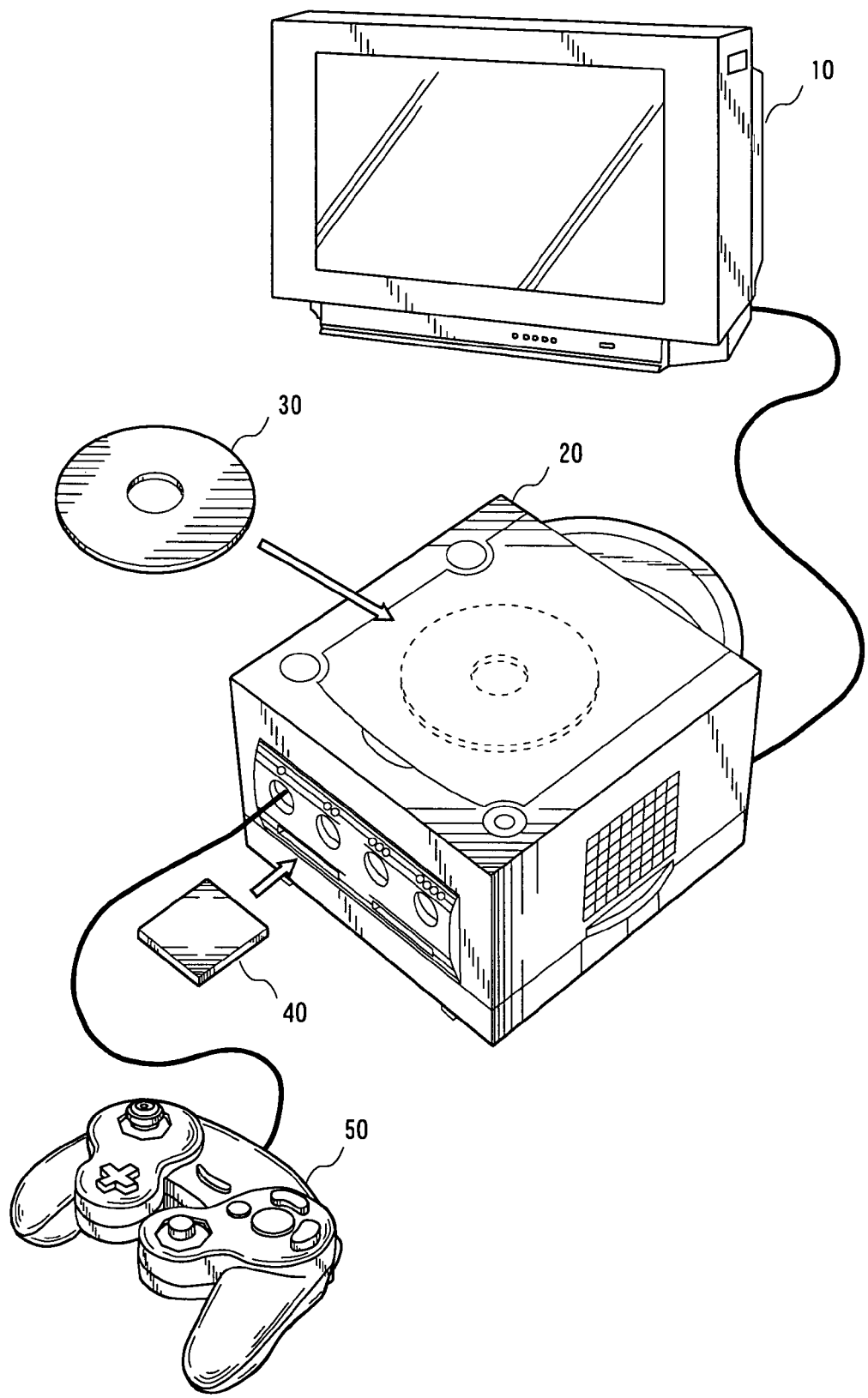
FIG. 1 is a general view showing a game system according to one illustrative exemplary non-limiting implementation of the game apparatus of the game apparatus disclosed herein.

FIG. 1 is a general view showing a game system in accordance with one illustrative exemplary non-limiting implementation of the game apparatus disclosed herein. In FIG. 1, a TV monitor 10 is coupled to the game processing apparatus 20, so that a game image which is generated by the game processing apparatus 20 is displayed on the screen of the TV monitor 10. A DVD 30 is mounted to the game processing apparatus 20. The DVD 30 stores a game program for causing the game processing apparatus 20 to execute game processing (described later), game data to be used for the game processing, and correspondence information (described later). A controller 50 to be operated by a player is coupled to the game processing apparatus 20. An external memory card 40 is mounted to the game processing apparatus 20 as necessary. The external memory card 40 is composed of non-volatile memory so as to be capable of storing the data which is generated during the game process as necessary.

Figure 2:
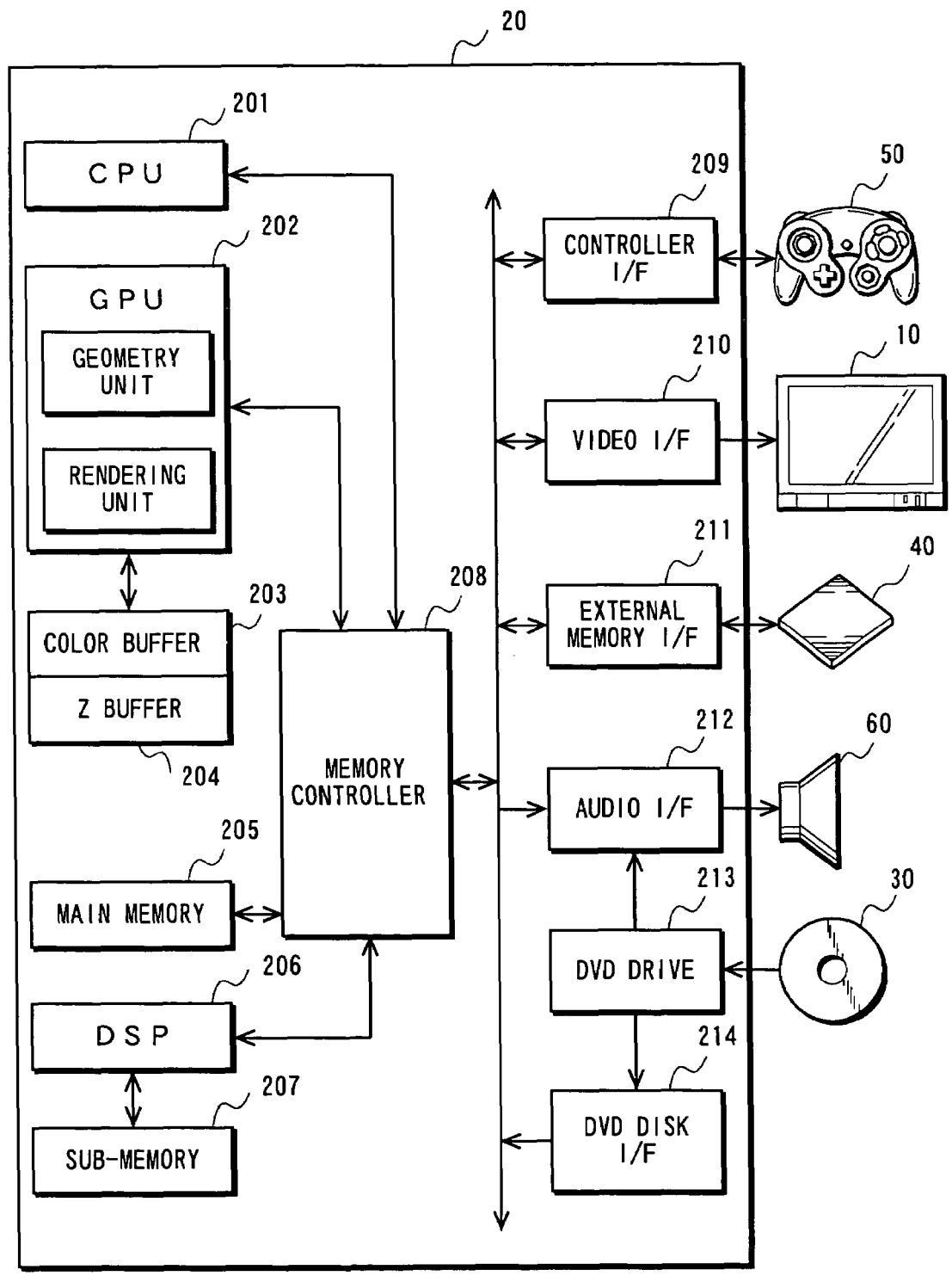
FIG. 2 is a block diagram illustrating an exemplary internal structure of a game processing apparatus 20.

Referring to FIG. 2, the internal structure of the game processing apparatus 20 will be described. The game processing apparatus 20 includes: a CPU 201 which performs game processing in accordance with the game program; a GPU 202 which performs an image generation process by utilizing a geometry unit and a rendering unit; a color buffer 203 and Z buffer 204 used for image processing; a main memory 205; a DSP 206 which is mainly in charge of audio processing and a sub-memory 207 to be used in conjunction therewith; a memory controller 208 for controlling the data transfer between different units; a controller I/F 209 for enabling signal exchanges with the controller 50; a video I/F 210 for enabling signal exchanges with the TV monitor 10; an external memory I/F 211 for enabling signal exchanges with the external memory card 40; an audio I/F 212 for enabling signal exchanges with a loudspeaker 60; a DVD drive 213 which writes or reads data on the DVD 30; and a DVD disk I/F 214 for enabling data exchanges with the DVD 30.

Figure 3:
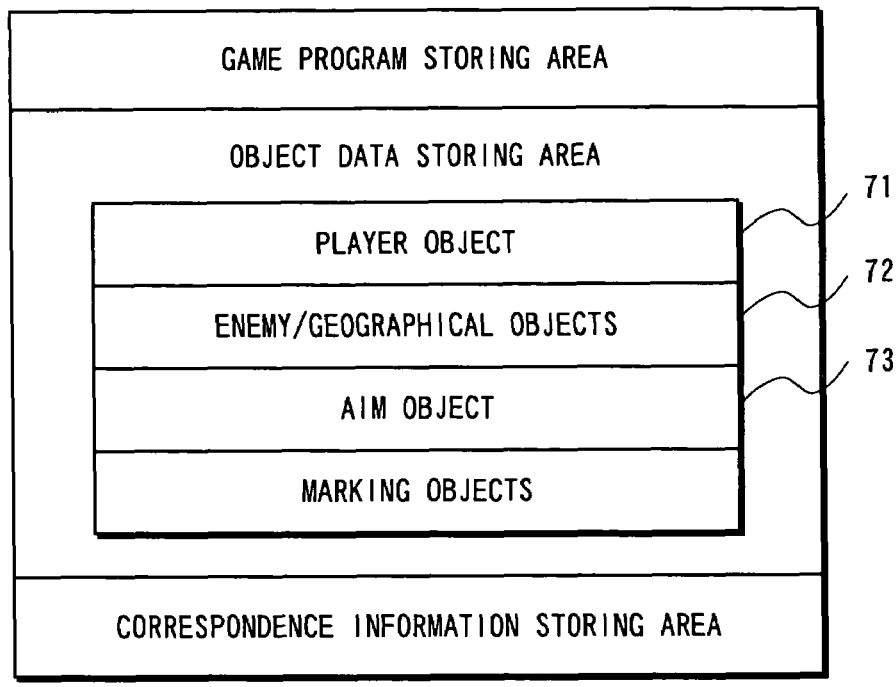
FIG. 3 is a memory map of a main memory 205.

Next, referring to FIGS. 3 to 7, a memory map of the main memory 205 included in the game processing apparatus 20 will be described. As shown in FIG. 3, the main memory 205 is provided with: a game program storing area for storing the game program which is read from the DVD 30; an object data storing area for storing object data which is read from the DVD 30 and various data concerning objects which are generated during the game processing; and a correspondence information storing area for storing correspondence information which is read from the DVD 30. The object data storing area includes: an area 71 for storing data concerning a player object controlled by the user; an area 72 for storing data concerning enemy objects (e.g., monsters) and geographical objects (e.g., trees); an area 73 for storing data concerning aim objects, and an area for storing data concerning marking object used in the marking process described later. Hereinafter, these areas will be more specifically described.

Figure 4:
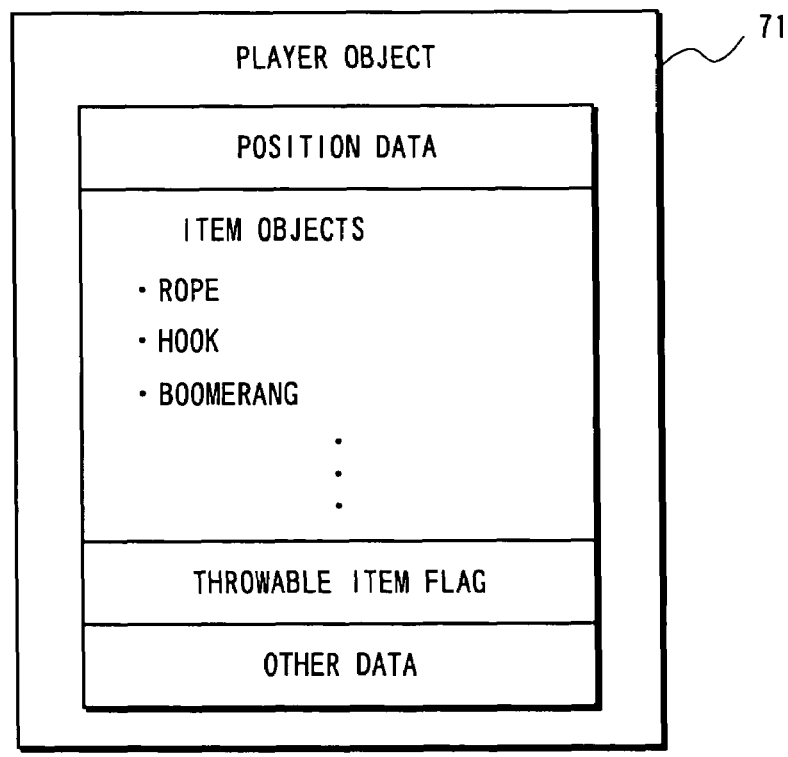
FIG. 4 is a partial detailed memory map of the main memory 205.

As shown in FIG. 4, the area 71, which is used for storing data concerning a player object, stores not only data used for generating the player object (polygons, textures, etc.) but also position data indicating a position of the player object, object data corresponding to items which can be selected by the player (e.g., a rope, a hook, and a boomerang), and throwable item flags assigned for respective items to indicate whether each item is currently used by the player.

Figure 5:
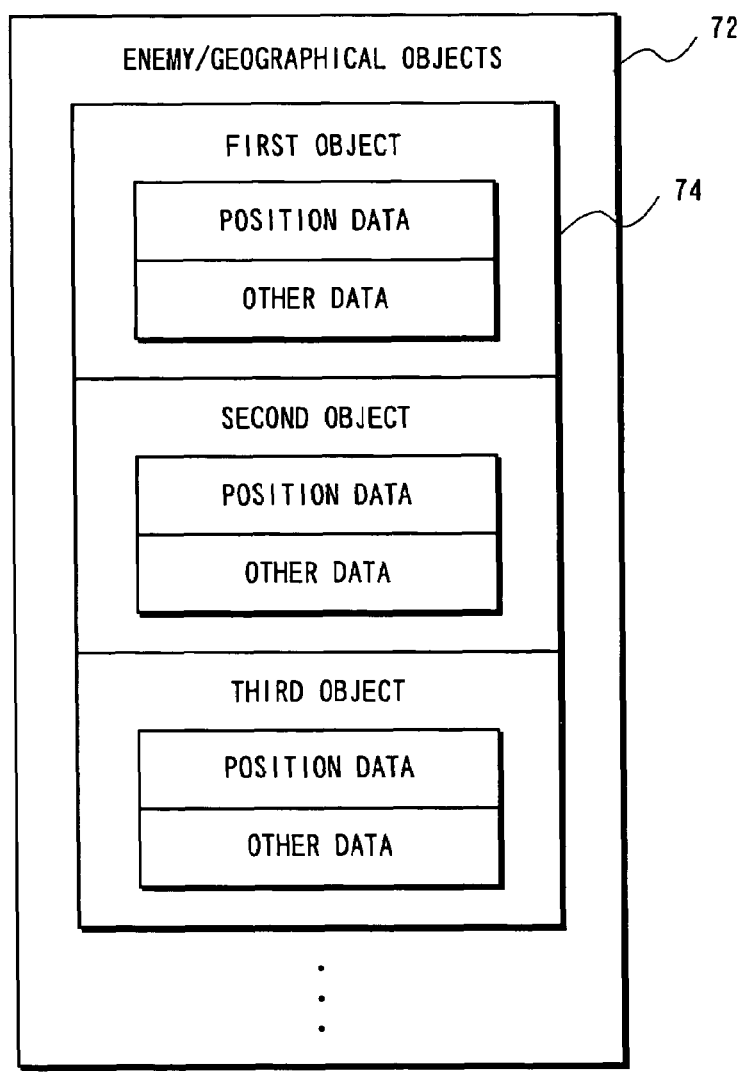
FIG. 5 is a partial detailed memory map of the main memory 205.

As shown in FIG. 5, the area 72, which is used for storing data concerning enemy objects and geographical objects, stores data concerning each object. For example, an area 74 in the area 72 may be allocated for storing data concerning a first object, so as to store data used for generating the first object as well as position data concerning the first object.

Figure 6:
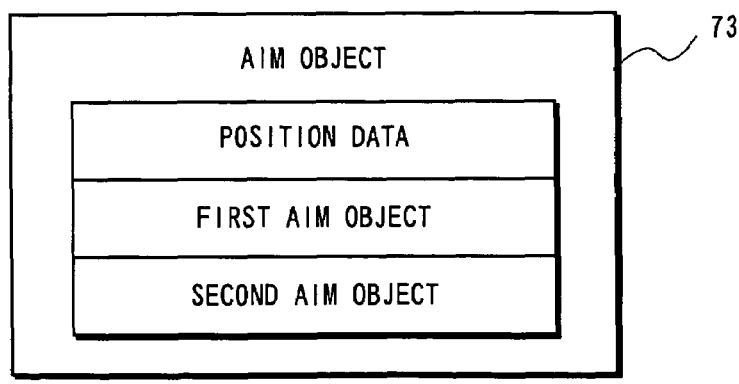
FIG. 6 is a partial detailed memory map of the main memory 205.

As shown in FIG. 6, the area 73, which is used for storing data concerning aim objects, stores data used for generating an aim object as well as position concerning the aiming point, data concerning a first aim object (i.e., an aiming point being displayed in the first display mode described later), and a second aim object (i.e., an aiming point being displayed in the second display mode described later).

The correspondence information storing area shown in FIG. 3 stores correspondence information as shown in FIG. 7. In the illustrated correspondence information, for each item, a shooting range and an object(s) corresponding to that item are defined. For example, a "hook" item has a shooting range of "15", and a first object and a second object are defined as objects which the hook item will be effective on. In other words, if either the first object or the second object exists within a range of "15" (by arbitrary units) from where the player character is, it is possible to effectively use the hook item for this object(i.e., so as to hook onto the object). On the other hand, it is impossible to effectively use the hook item for any object which exists outside the range of "15" from where the player character is. As for a third object defined in the table shown in FIG. 7, the hook item cannot be effectively used even if the third object exists within the range of "15" from where the player character is.

Hereinafter, referring to the flowcharts shown in FIGS. 8 to 12, a flow of game processing which is to be performed by the CPU 201 of the game processing apparatus 20 in accordance with the game program will be described.

Figure 8:
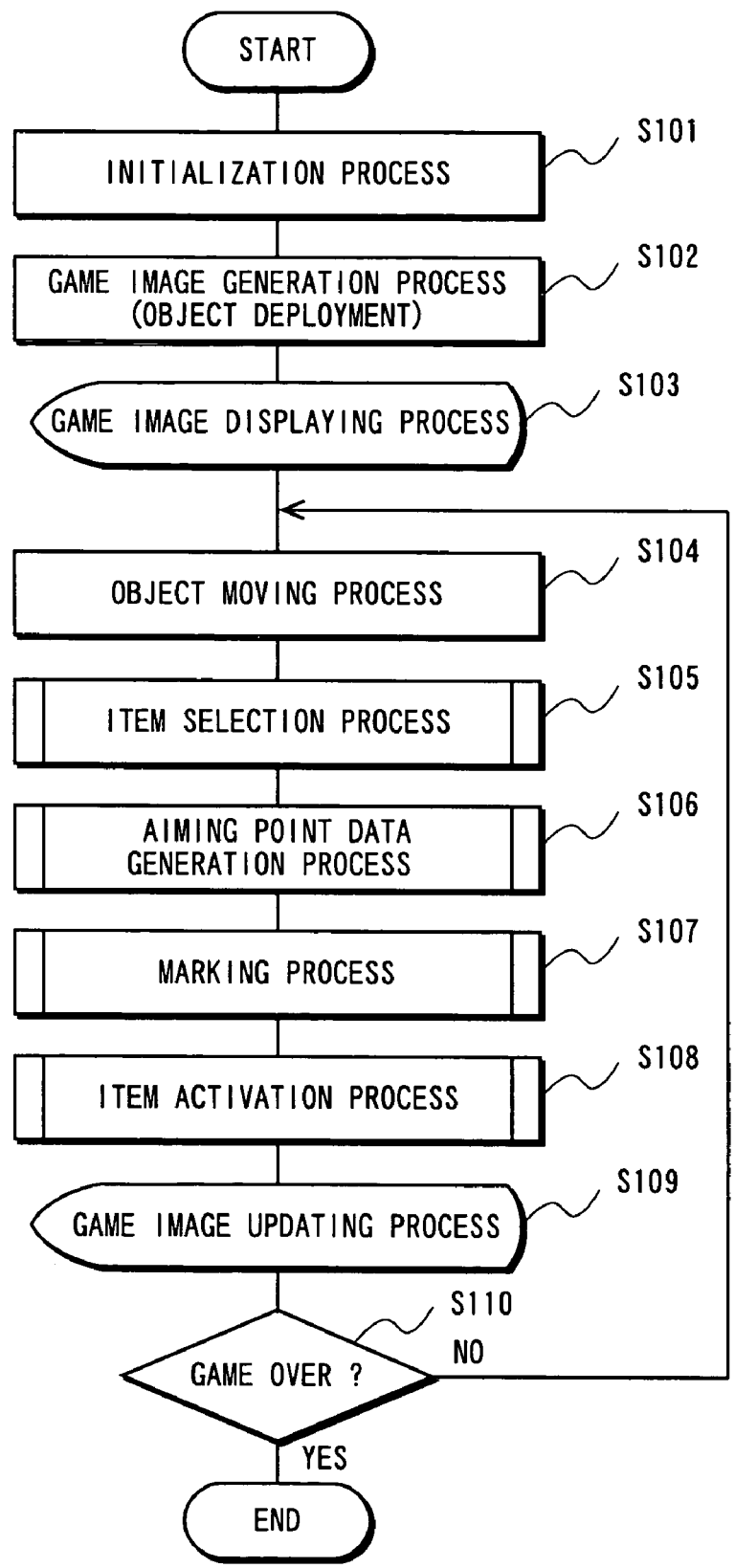
FIG. 8 is a flowchart illustrating an overall flow of the game processing performed by the game processing apparatus 20.

In FIG. 8, once game processing begins, an initialization process is performed (S101). Then, based on the game data stored in the DVD 30 or the main memory 205, the CPU 201 generates a game image by deploying the respective objects (the player object, enemy objects, and geographical objects) in the three-dimensional game space (S102). The game image data thus generated is output to the TV monitor 10 (S103).

Then, based on the game program and the game data stored in the DVD 30 or the main memory 205 as well as an input made via the controller 50, the CPU 201 moves the respective objects in the game space (i.e., the player object, enemy objects, geographical objects, item objects, aim object, marking objects, and the like) (S104). At this time, the game space after the objects have been moved is generated, and the game image data thus generated is stored to the color buffer 203 of the game processing apparatus 20. Thereafter, as described later, an item selection process (S105), an aiming point data generation process (S106), a marking process (S107), and an item activation process (S108) are consecutively performed, and finally the game image data stored in the color buffer 203 is output to the TV monitor 10 (S109). Then it is determined whether the game has come to an end (S110). If the game is to continue, control returns to step S104; if the game is over, the game processing is ended. Hereinafter, the processes of steps S105 to S108 will be specifically described.

Figure 9:
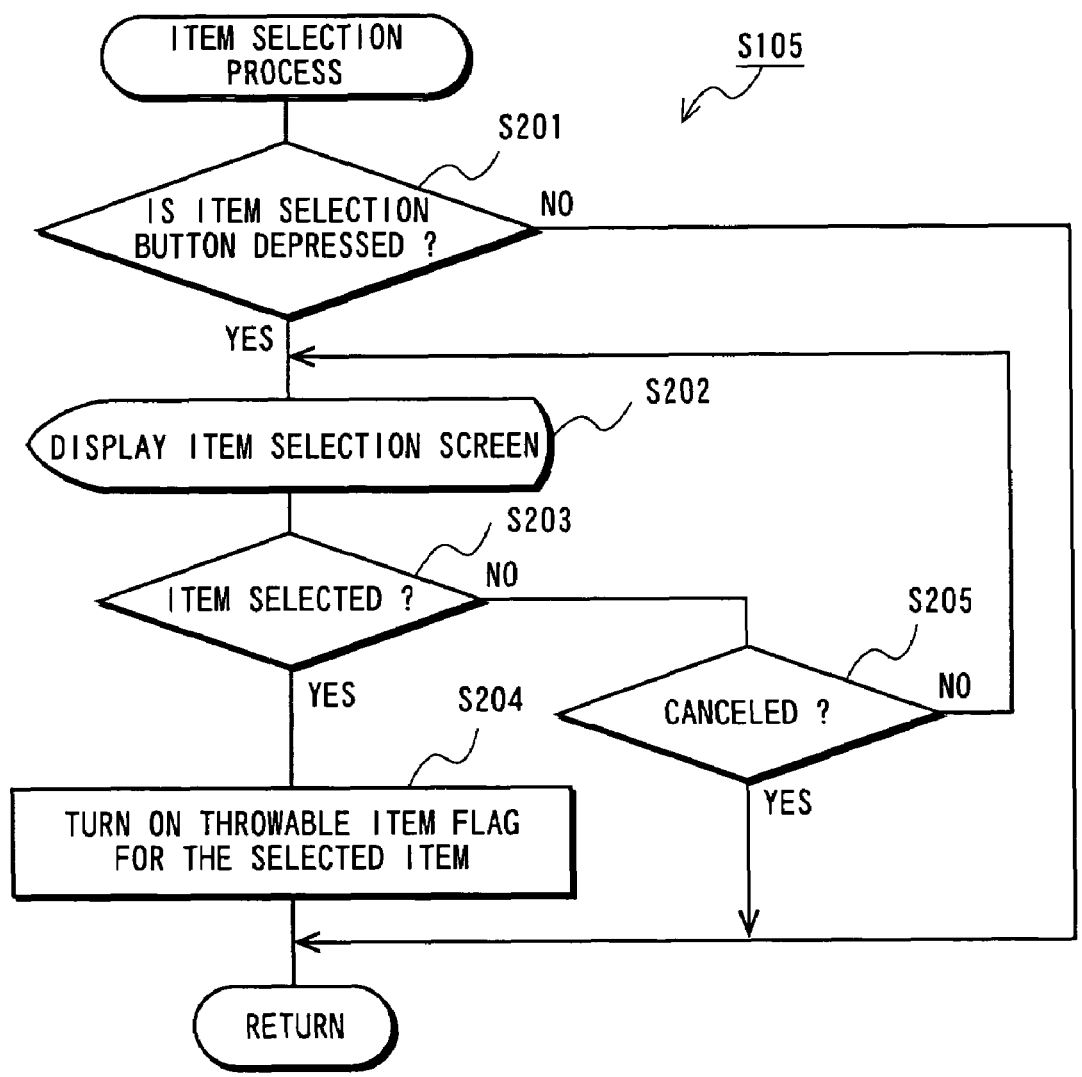
FIG. 9 is a detailed flowchart illustrating an item selection process.

Referring to FIG. 9, the item selection process of step S105 will be described. First, it is determined whether an item selection button (which is a predetermined button provided on the controller 50) has been depressed (S201). If the item selection button has been depressed, an item selection screen for allowing the player to select a throwable item (i.e., an item for the player to use in the game) is displayed on the TV monitor 10 (S202); specifically, game image data for the item selection screen is generated and output to the TV monitor 10. On the other hand, if the item selection button has not been depressed, the item selection process is ended.

After the item selection screen is displayed at step S202, it is determined whether a throwable item has been selected (S203). If a throwable item has been selected, a throwable item flag corresponding to the selected item is turned on (S204), and the item selection process is ended. The determination as to whether a throwable item has been selected or not is made based on whether a predetermined button provided on the controller 50 (e.g., an ENTER button) has been depressed or not. On the other hand, if no throwable item has been selected at step S203, it is determined whether the item selection has been canceled or not (S205). If the item selection has been canceled, the item selection process is ended. If the item selection has not been canceled, control returns to step S202. The determination as whether the item selection has been canceled or not is made based on whether a predetermined button provided on the controller (e.g., a cancel button) has been depressed or not. Thus, the item selection screen keeps being displayed on the TV monitor 10 until an item is selected by the player, or until the item selection is canceled.

Figure 10:
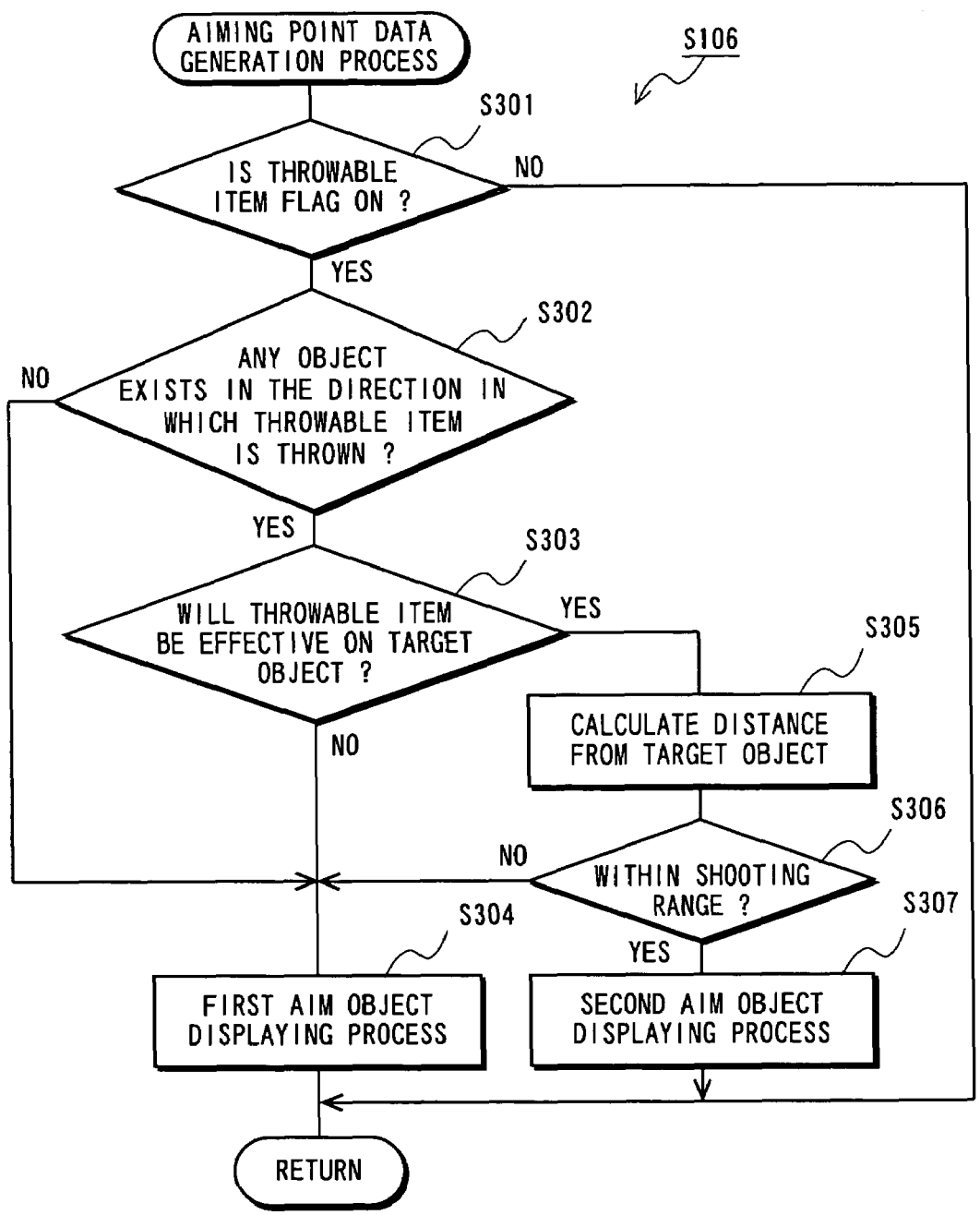
FIG. 10 is a detailed flowchart illustrating an aiming point data generation process.
Figure 13:
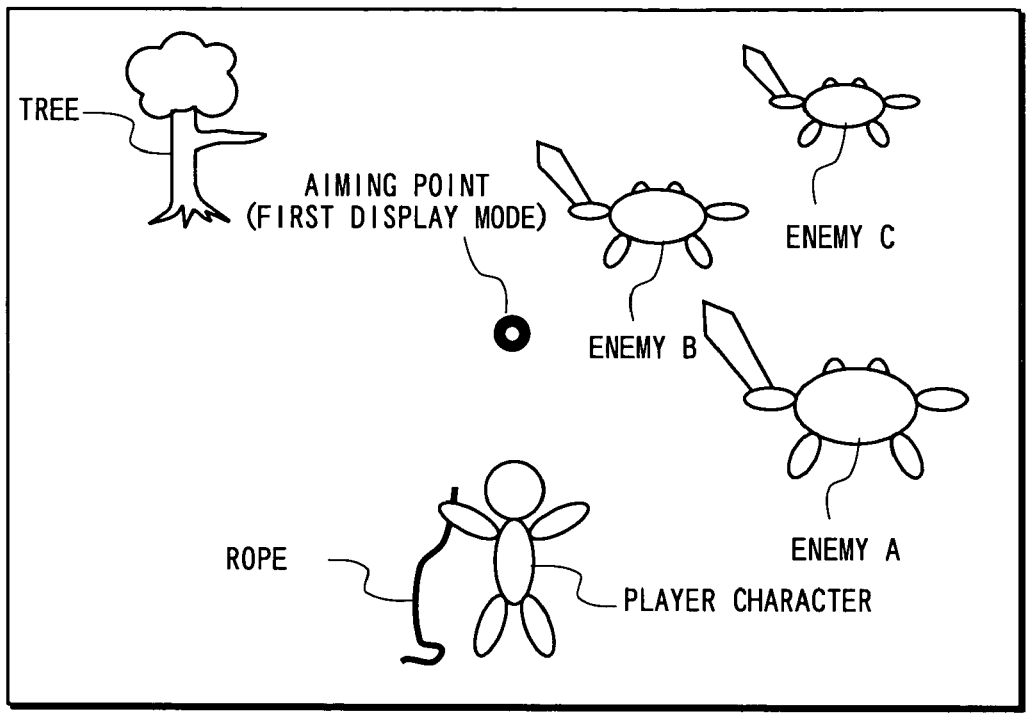
FIG. 13 shows an exemplary game image in the case where no object exists in the direction in which an item is to be thrown.

Next, referring to FIG. 10, the aiming point data generation process of step S106 will be described. First, by referring to the throwable item flag corresponding to each item, it is determined which throwable item flag is currently on (S301). If none of the throwable item flags is currently on, the aiming point displaying process is ended. On the other hand, if any throwable item flag is on, it is then determined whether any object exists in the direction in which the throwable item is to be thrown (S302). As described later, an aiming point is displayed in the direction in which the throwable item is to be thrown. The player can rely on the aiming point to freely control the direction in which to throw the throwable item, by using the controller 50. If no object exists in the direction in which the throwable item is to be thrown, a first aim object displaying process (i.e., a process of drawing a first aim object into the color buffer 203) is performed to display an aiming point in a first display mode in that direction (S304), and the aiming point displaying process is ended. An exemplary game image in this case is shown in FIG. 13. In the example shown in FIG. 13, the aiming point is being displayed in the first display mode to allow the player to recognize that there is no use in throwing the rope in the indicated direction.

Figure 14:
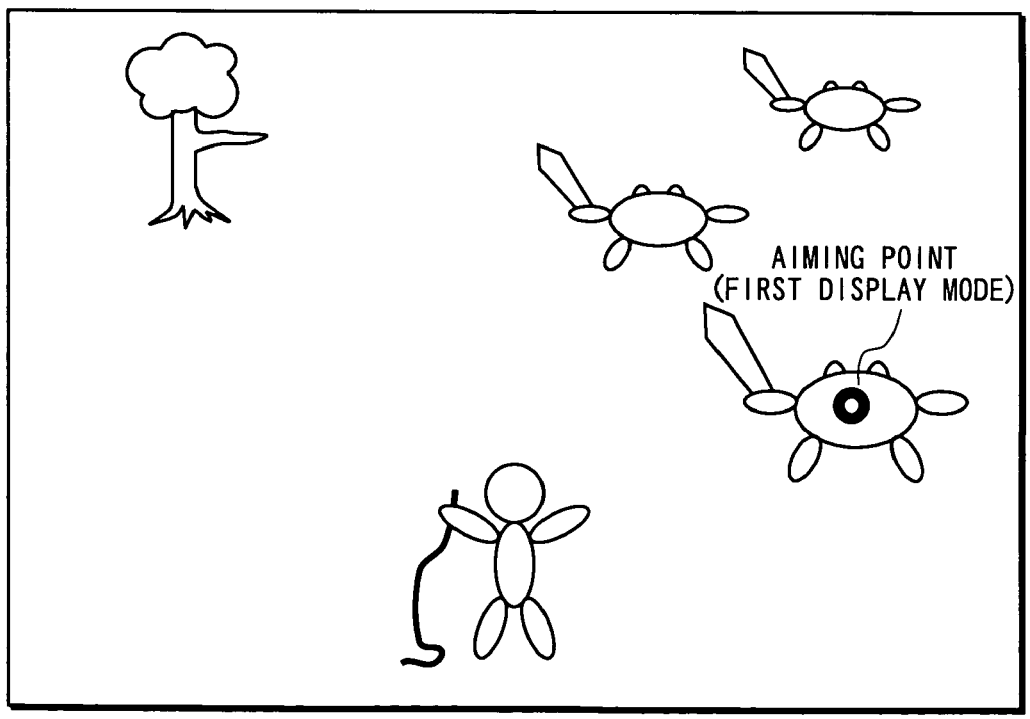
FIG. 14 shows an exemplary game image in the case where an object exists in the direction in which an item is to be thrown, such that the item will not be effective on the object.

On the other hand, if step S302 finds any object existing in the direction in which the throwable item is to be thrown (hereinafter, such an object will be referred to as a "target object"), it is then determined whether the throwable item will be effective on the target object, by referring to the correspondence information shown in FIG. 7 (S303). If it is determined that the throwable item will not be effective on the target object, the aforementioned first aim object displaying process is performed (S304), and the aiming point displaying process is ended. An exemplary game image in this case is shown in FIG. 14. Note that it is assumed that the "first object" in the table shown in FIG. 7 corresponds to trees shown in FIG. 14. Since a rope item will not be effective on an enemy A, the aiming point is displayed in the first display mode so as to overlap the enemy A, thereby indicating the ineffectiveness of the rope item.

Figure 15:
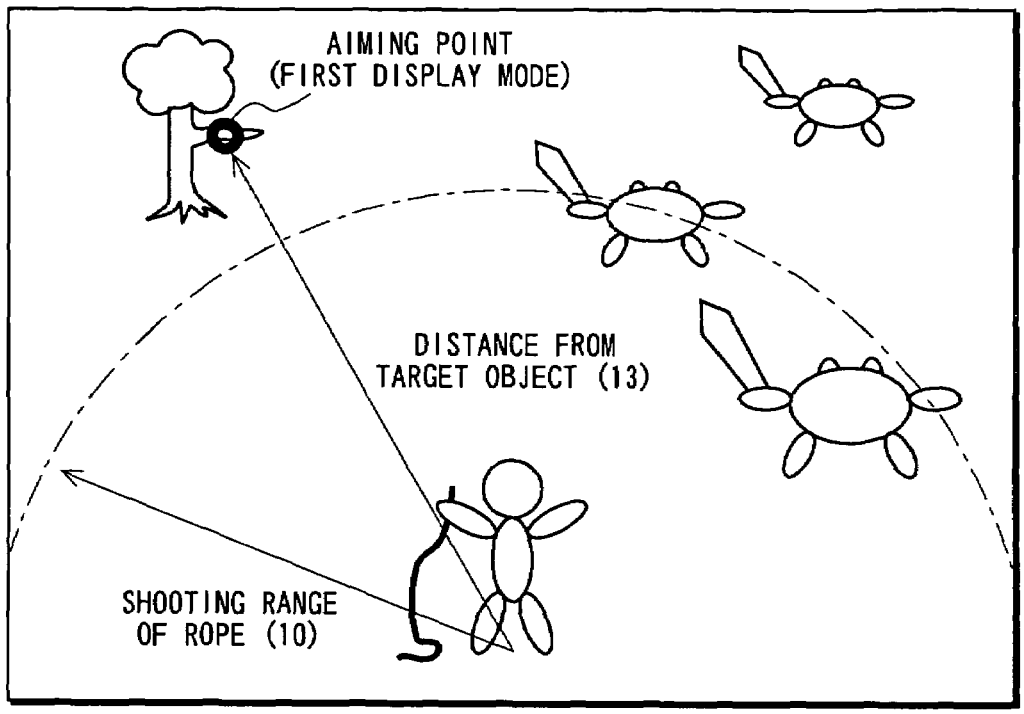
FIG. 15 shows an exemplary game image in the case where an object exists in the direction in which an item is to be thrown, such that the item will be effective on the object but the object is not within the throwing/shooting range of that item.

On the other hand, if step S303 finds that the throwable item will be effective on the target object, the distance from the player object to the target object is calculated (S305). Thereafter, by referring to the correspondence information shown in FIG. 7, it is determined whether the target object is located within the shooting range of the throwable item (S306). If it is determined that the target object is located outside the shooting range of the throwable item, the aforementioned first aim object displaying process is performed (S304), and the aiming point displaying process is ended. An exemplary game image in this case is shown in FIG. 15. In the example shown in FIG. 15, the distance from the player character to the tree is "13" (by arbitrary units), and therefore is greater than the shooting range of the rope item, i.e., "10". Since the rope will not reach the tree even if thrown, the aiming point is displayed in the first display mode so as to overlap the tree, thereby indicating the farness of the tree.

Figure 16:
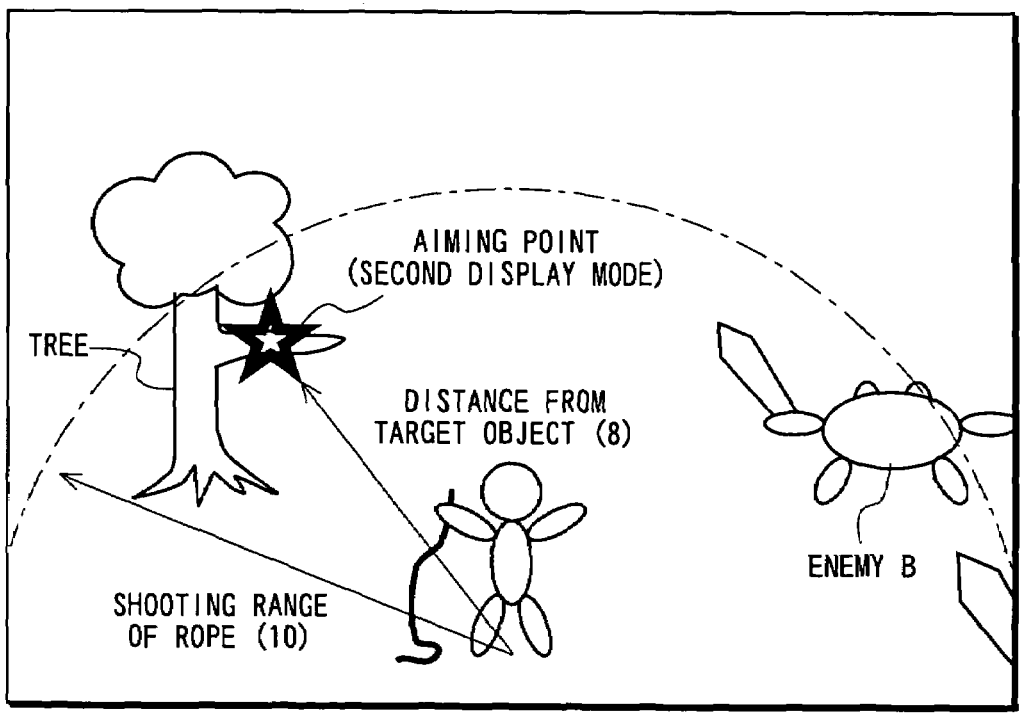
FIG. 16 shows an exemplary game image in the case where an object exists in the direction in which an item is to be thrown, such that the item will be effective on the object and the object is within the throwing/shooting range of that item.

On the other hand, if step S306 finds that the target object is located within the shooting range of the throwable item, a second aim object displaying process (i.e., a process of drawing a second aim object into the color buffer 203) is performed to display an aiming point in a second display mode in the direction in which the throwable item is to be thrown, so as to overlap the target object (S307), and the aiming point displaying process is ended. An exemplary game image in this case is shown in FIG. 16. In the example shown in FIG. 16, the distance from the player character to the tree is "8" (by arbitrary units), and therefore is greater than the shooting range of the rope item, i.e., "10". Since the rope will reach the tree if thrown, the aiming point is displayed in the second display mode so as to overlap the tree, thereby indicating the nearness of the tree.

Figure 11:
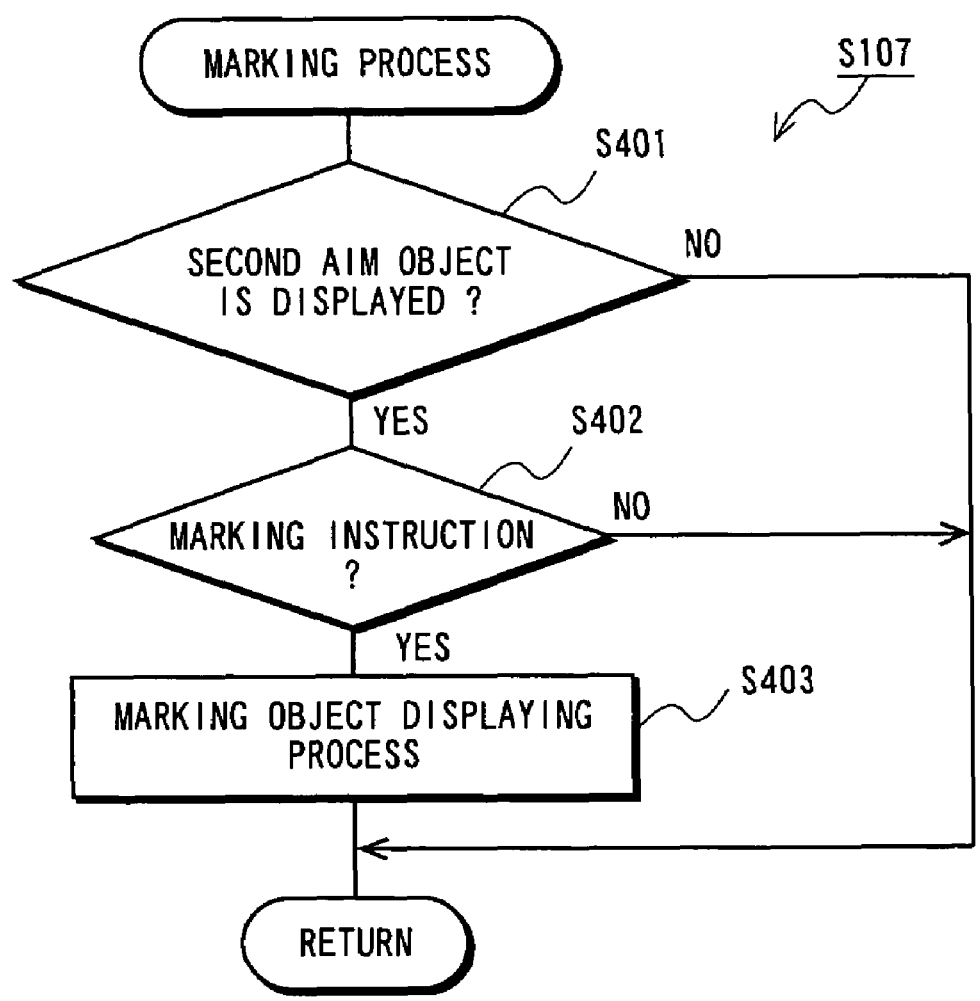
FIG. 11 is a detailed flowchart illustrating a marking process.
Figure 17:
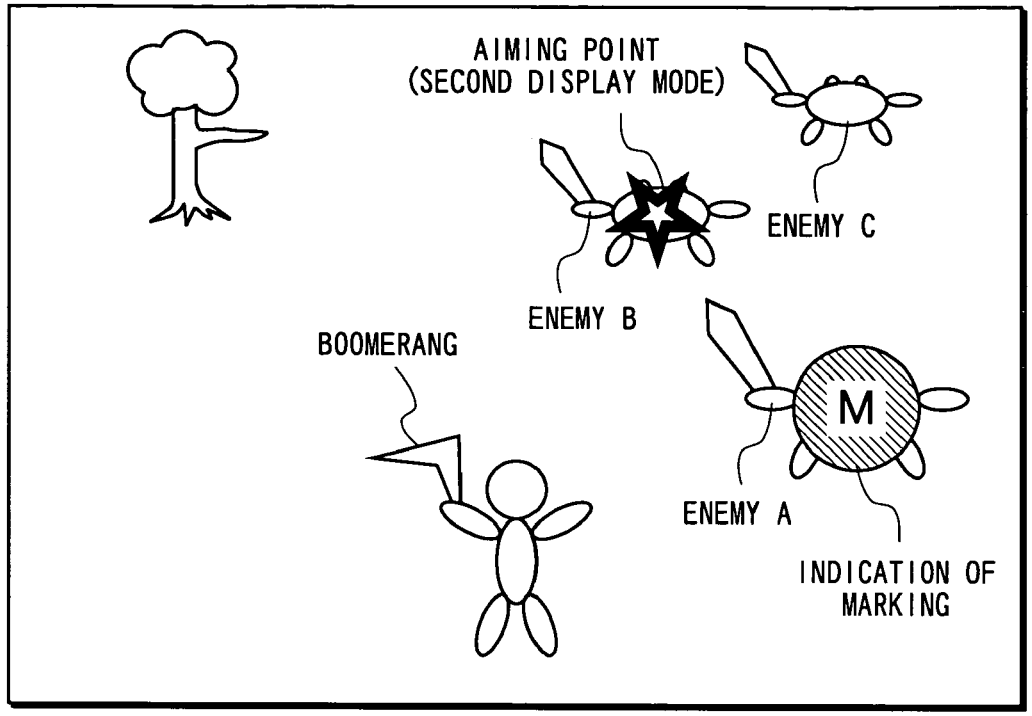
FIG. 17 shows an exemplary game image in the case where an enemy A is marked.
Figure 18:
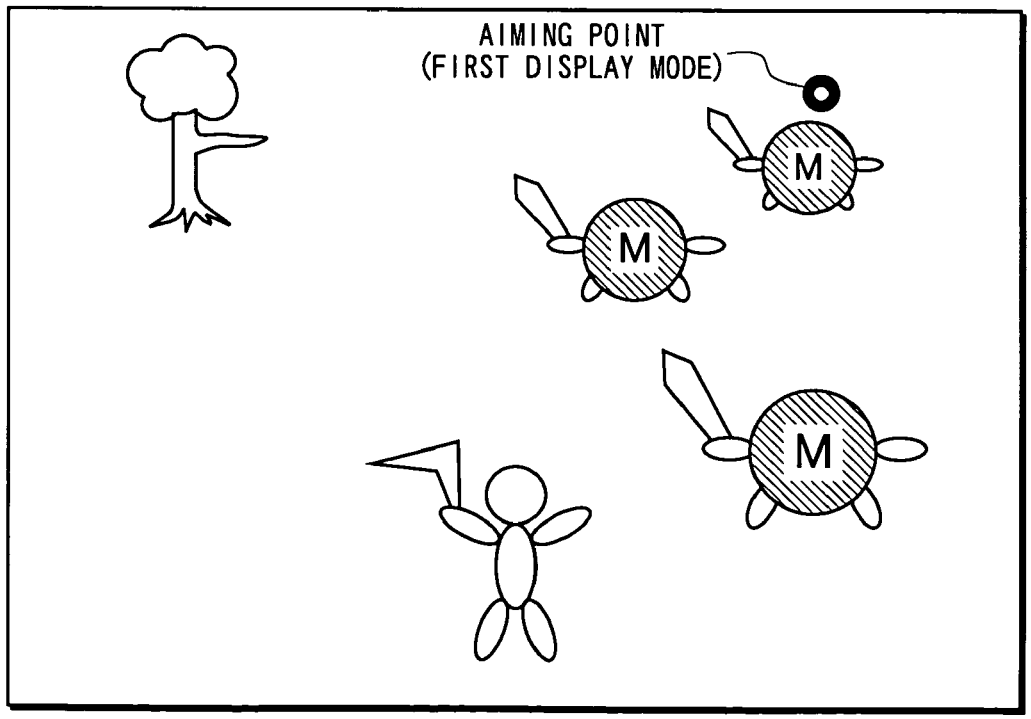
FIG. 18 shows an exemplary game image in the case where a plurality of enemies are marked at the same time.

Next, referring to FIG. 11, the marking process of step S107 will be described. First, it is determined whether the second aim object is being displayed on the game screen (S401). This determination may be made by, for example, checking whether step S307 was performed in the immediately preceding instance of the aiming point displaying process (S105). If step S401 finds that the second aim object is being displayed, it is then determined whether the player has instructed marking (S402). As used herein, "marking" means locking-on a target object. Once a target is marked, i.e., locked-on, the aiming point will automatically follow that object thereafter. By throwing the throwable item after marking an object, it is ensured that the throwable item will hit the object even if the object moves away immediately after the throwable item is thrown. If step S401 finds that a marking instruction has been given, a marking object displaying process (i.e., a process of drawing a marking object into the color buffer 203) is performed to display a mark in the neighborhood of the target object to indicate that the target object has been marked (S403), and the marking process is ended. Note that the mark thus displayed will be moved during the aforementioned moying process of step S102 in accordance with the movement of the marked object. The aiming point can still be displayed after an object is marked, and by overlaying the aiming point on another object for further marking, it is possible to simultaneously mark a plurality of objects. For example, after the enemy A is marked as shown in FIG. 17, the player may proceed to further mark an enemy B and an enemy C as shown in FIG. 18. On the other hand, if step S401 finds that a second aim object is not being displayed, or if step S402 finds that no marking instruction has been given, the marking process is ended.

Figure 12:
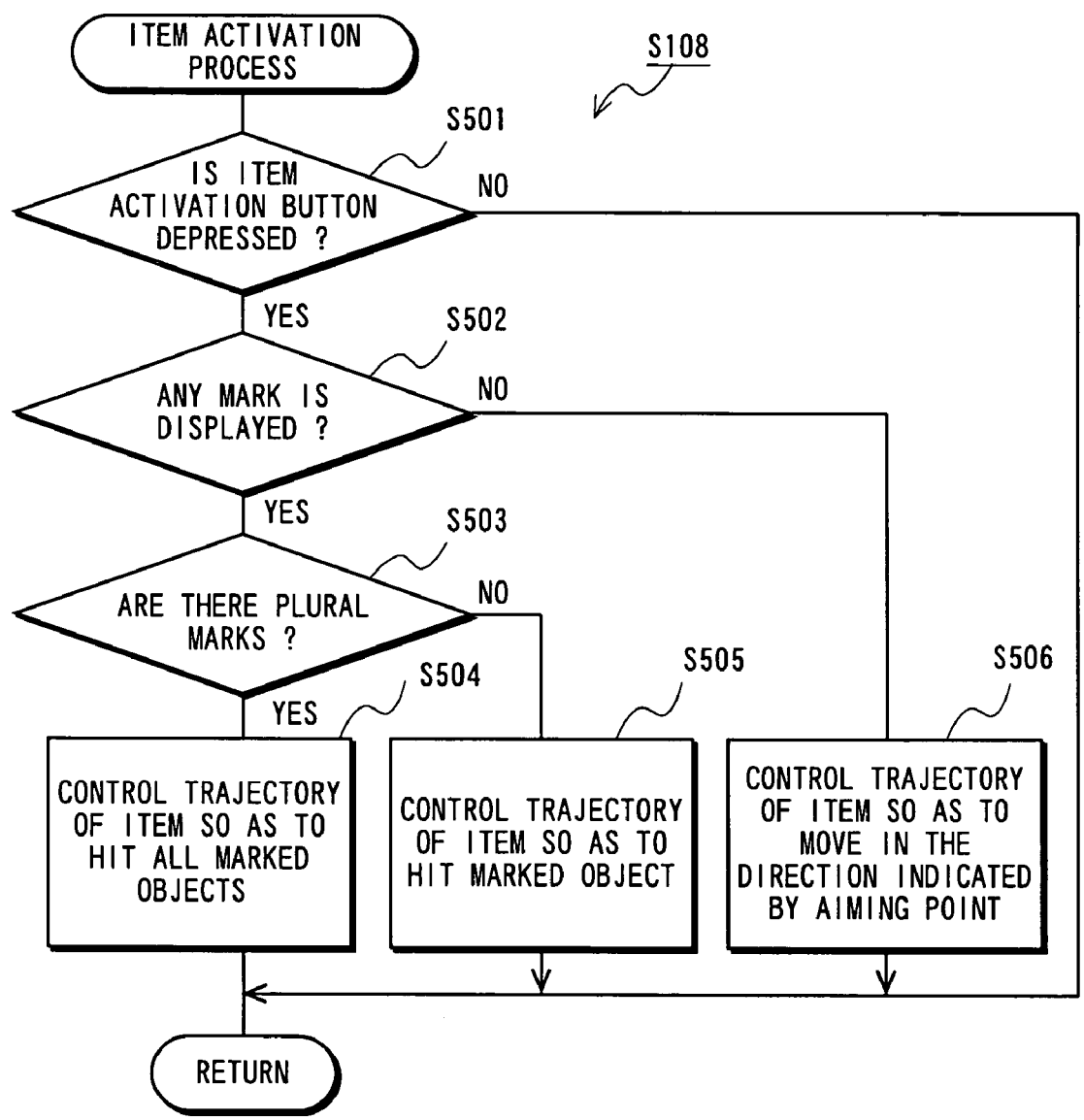
FIG. 12 is a detailed flowchart illustrating an item activation process.
Figure 19:
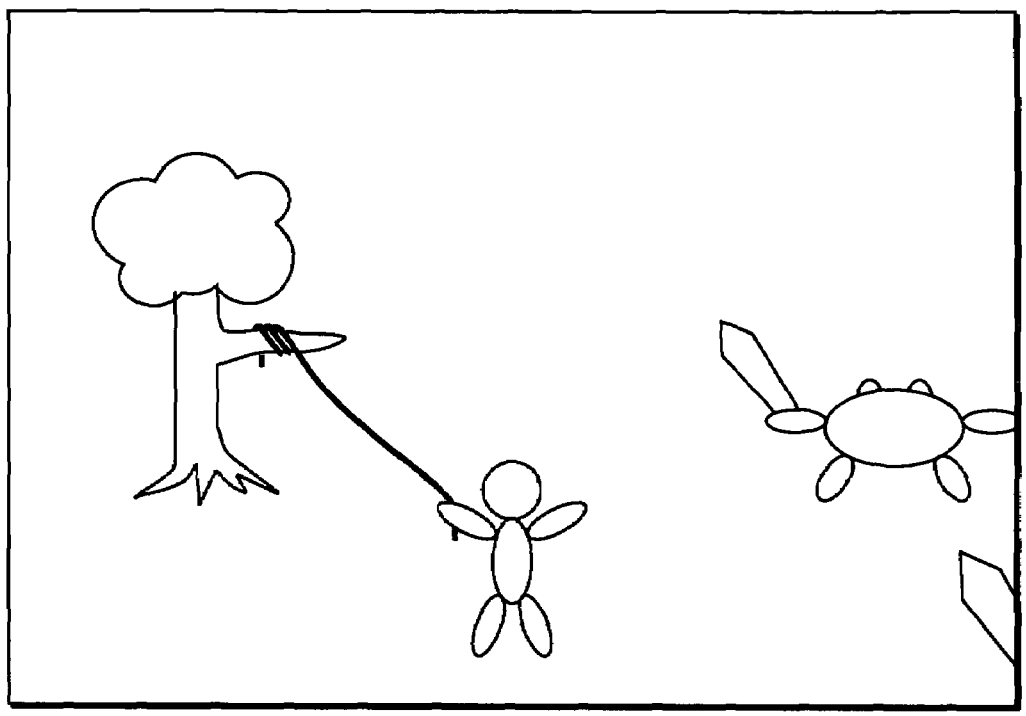
FIG. 19 shows an exemplary game image which results if the item is thrown in the state shown in FIG. 16.

Next, referring to FIG. 12, the item activation process of step S108 will be described. First, it is determined whether the player has depressed an item activation button provided on the controller 50 (S501). If the item activation button has not been depressed, the item activation process is ended. If the item activation button has been depressed, it is then determined whether any mark is being displayed, i.e., whether one or more marked objects exist or not (S502). If no marks are being displayed, the trajectory of the throwable item is controlled so that the throwable item appears thrown in the direction indicated by the aiming point (S506), and the item activation process is ended. Thus, the throwable item is thrown in the direction indicated by the aiming point. An exemplary game image in this case is shown in FIG. 19. The example shown in FIG. 19 illustrates a result of throwing the item in the state shown in FIG. 16.

Figure 20:
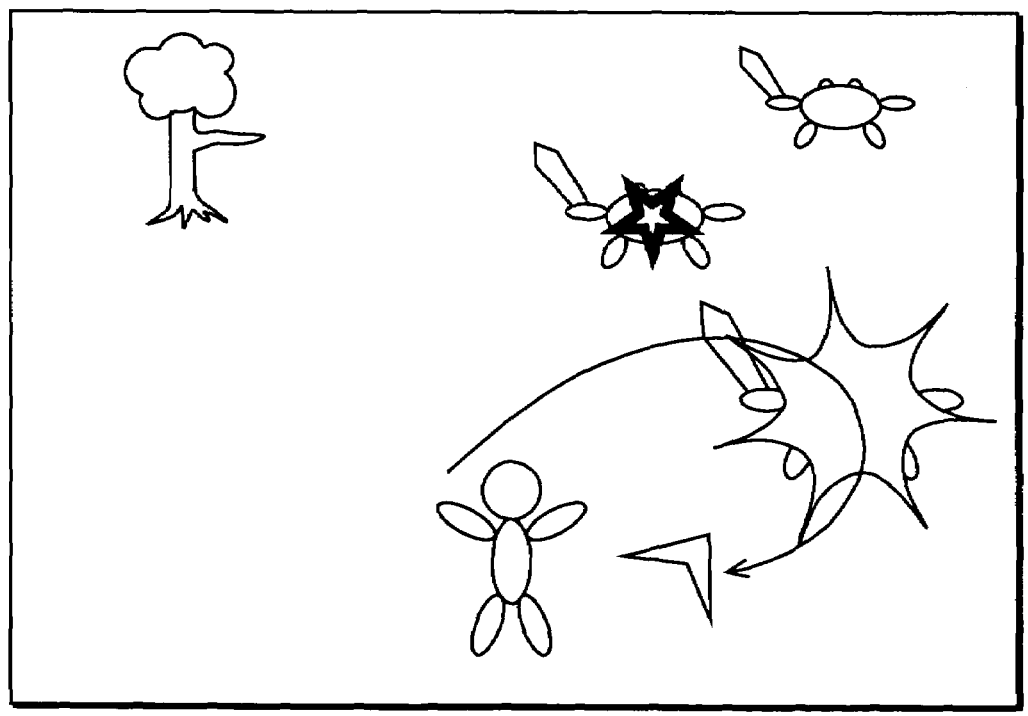
FIG. 20 shows an exemplary game image which results if the item is thrown in the state shown in FIG. 17.

On the other hand, if step S502 finds that any mark is being displayed, it is then determined whether a plurality of objects are being concurrently marked (S503). If only one object is being marked, the action of the throwable item is controlled so that the throwable item will hit that object (S505), and the item activation process is ended. As a result, the throwable item appears thrown at the marked object. An exemplary game image in this case is shown in FIG. 20. The example shown in FIG. 20 illustrates a result of throwing the item in the state shown in FIG. 17, where a special effect (indicating a hit) is being applied to the object which has been hit by the throwable item.

Figure 21:
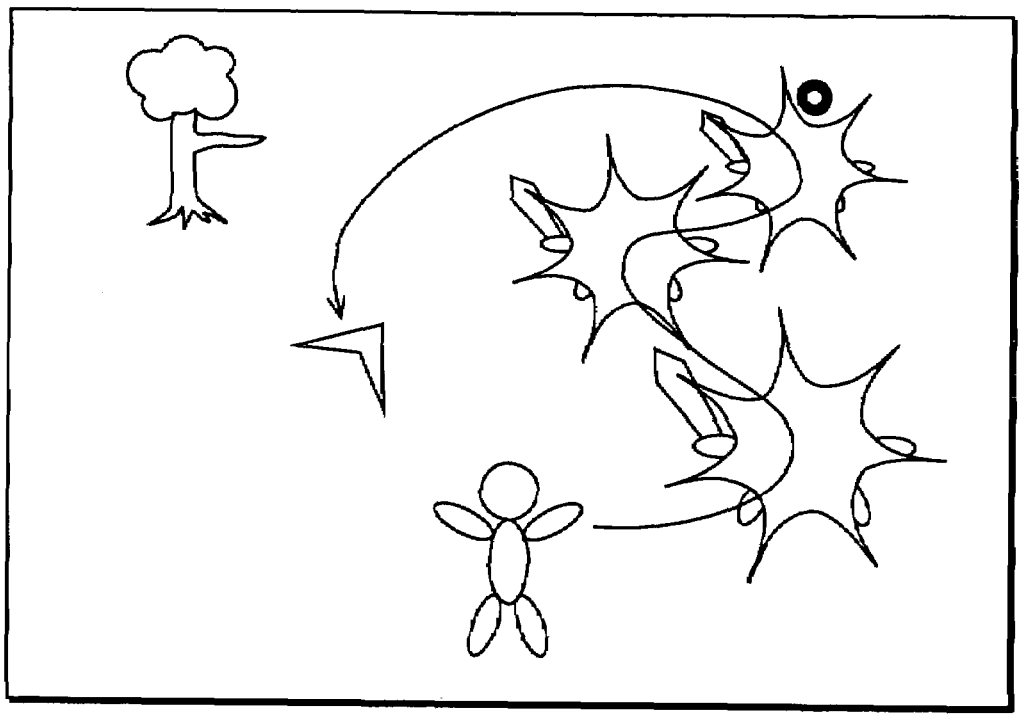
FIG. 21 shows an exemplary game image which results if the item is thrown in the state shown in FIG. 18.

On the other hand, if step S503 finds that a plurality of objects are being concurrently marked, the action of the throwable item is controlled so that the throwable item will hit these objects (S504), and the item activation process is ended. As a result, the throwable item appears thrown at the marked objects. An exemplary game image in this case is shown in FIG. 21. The example shown in FIG. 21 illustrates a result of throwing the item in the state shown in FIG. 18, where a special effect (indicating a hit) is being applied to the objects which have been hit by the throwable item.

The above embodiment illustrates an example where the display mode of the aiming point is changed based on the effectiveness of a throwable item as determined with respect to an object (e.g., a tree or an enemy) which is displayed on the game screen. In other embodiments, it may be desirable to assign a throwable item so as to be effective only on a portion of an object which is displayed on the game screen. For example, a rope item may be made effective on a "branch" of a tree, but not on other portions (e.g., the root, trunk, or leaves) of the tree. This can be easily realized by employing a transparent object which cannot be visually recognized by the player. Hereinafter, this technique will be described with reference to FIG. 22 to FIG. 26.

Figure 22:
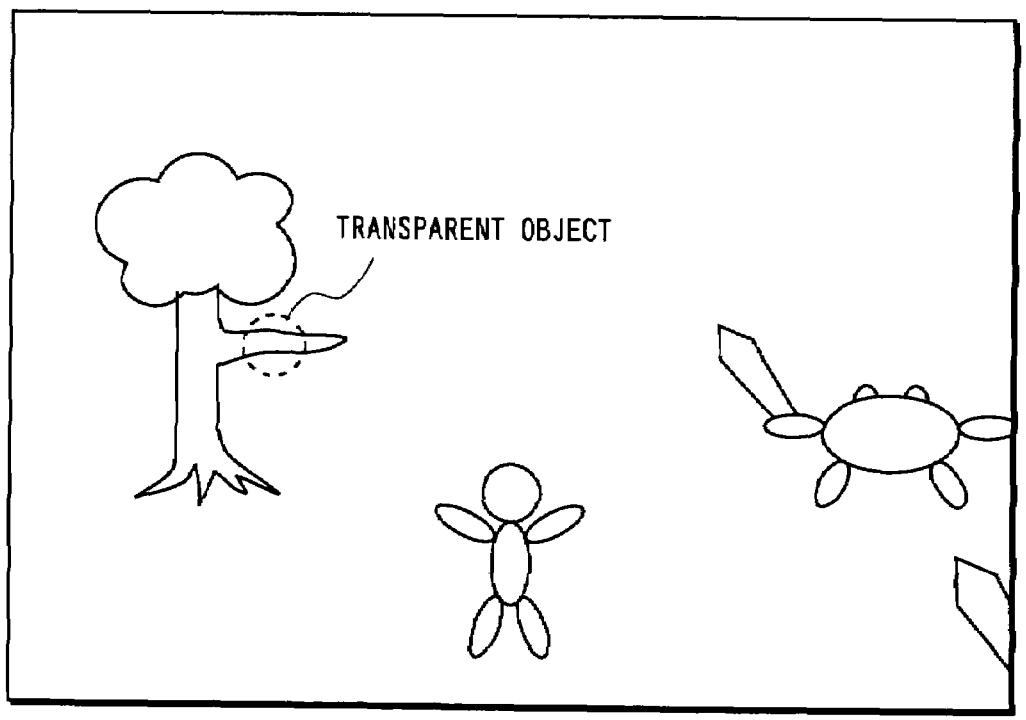
FIG. 22 shows an exemplary game image in the case where a transparent object is deployed.
Figures 23, 24:
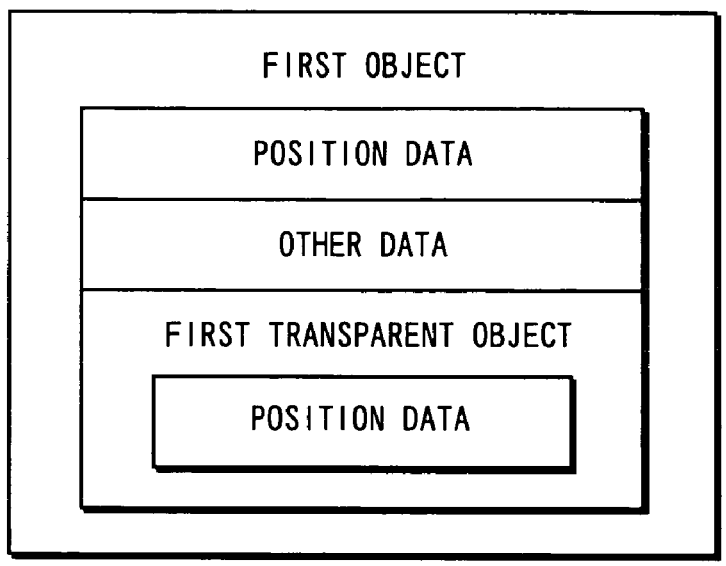
FIG. 23 is a partial detailed memory map of the main memory 205 in the case where a transparent object is deployed.
FIG. 24 is a table showing correspondence information in the case where a transparent object is deployed.
Figure 25:
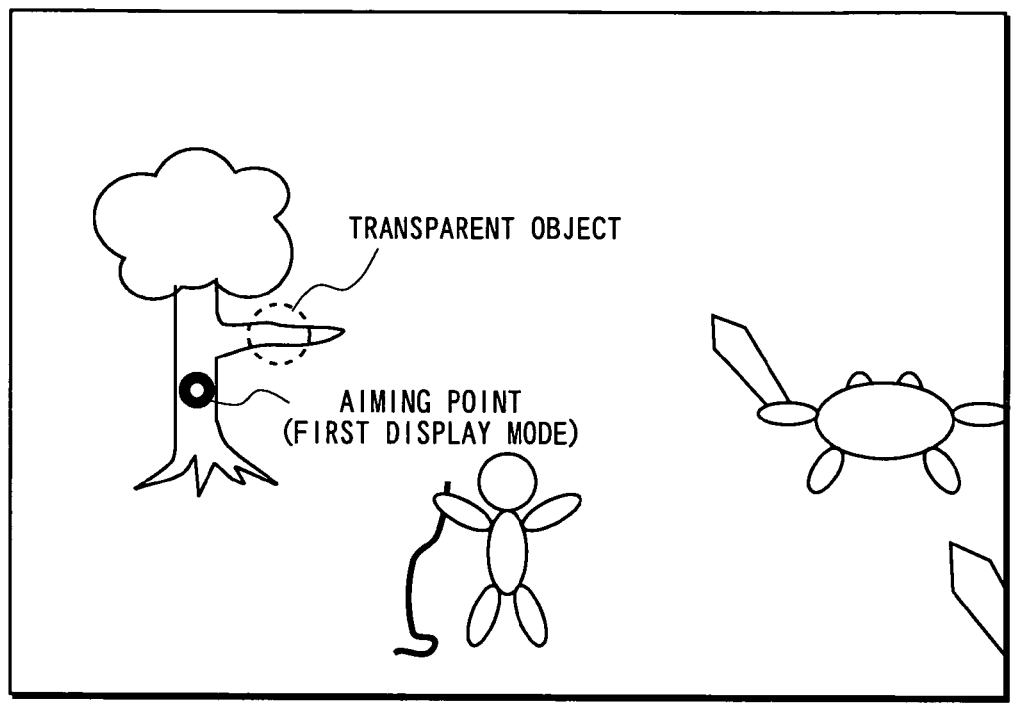
FIG. 25 shows an exemplary game image in the case where an object exists in the direction in which an item is to be thrown, such that the item will not be effective on the object.
Figure 26:
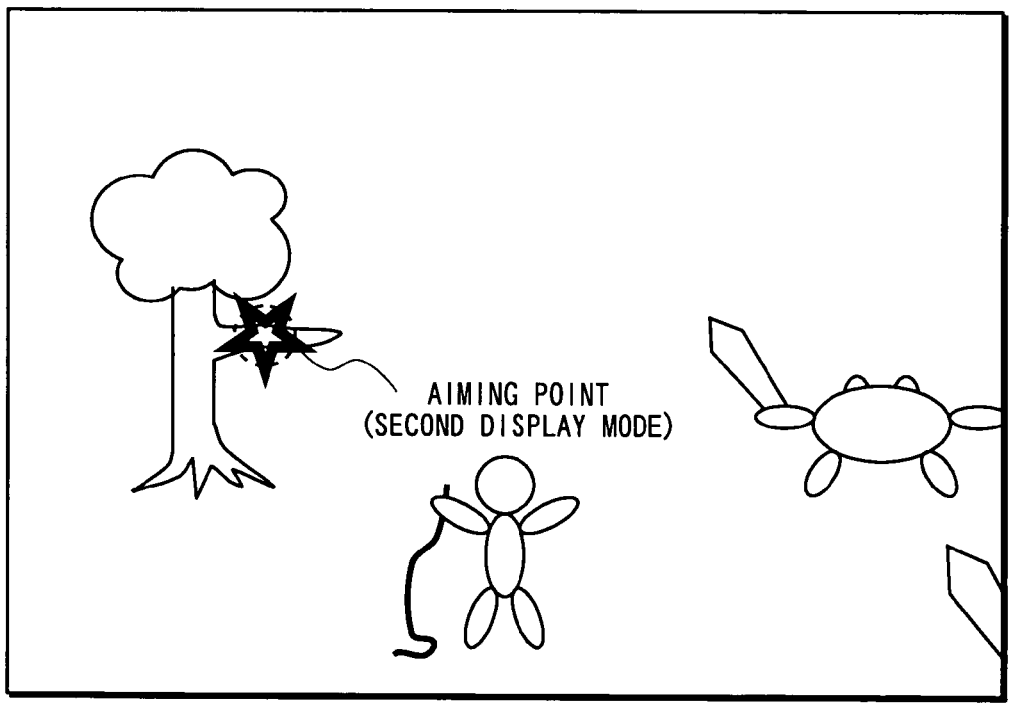
FIG. 26 shows an exemplary game image in the case where an object (a transparent object) exists in the direction in which an item is to be thrown, such that the item will be effective on the object.

First, a transparent object is placed on a predetermined portion of an object which is displayed on the game screen (this portion defines a portion which a specific item will be effective on). For example, a transparent object may be placed on a branch of a tree as shown in FIG. 22. The shape of the transparent object may be spherical as shown in FIG. 22, or may be any other shape. The data concerning the transparent object may be stored, for example, in association with the object on which the transparent object is placed, as shown in FIG. 23. In the example shown in FIG. 22, trees correspond to the "first object" in the table shown in FIG. 23, and the transparent object corresponds to the "first transparent object" in the table shown in FIG. 23. Furthermore, the correspondence between items and transparent objects is defined in the form of correspondence information as shown in FIG. 24. By performing processes similar to those described above on the basis of this correspondence information, it can be ensured that each throwable item will be effective on only a portion of an object displayed on the game screen. Specifically, in the example shown in FIG. 25, the object (tree) which exists in the direction in which a rope is to be thrown is not an object which the rope will be effective on, and therefore the aiming point is displayed in the first display mode. On the other hand, in the example shown in FIG. 26, a first transparent object exists in the direction in which the rope is to be thrown, and the rope will be effective on the first transparent object. Therefore, the aiming point is displayed in the second display mode.

Thus, by employing a transparent object, it is possible to arbitrarily designate a specific portion which an item will be effective on, regardless of the shape of the object displayed on the game screen. It will be appreciated that a plurality of transparent objects may be placed on a single object displayed on the game screen.

As described in the example above, the effectiveness of a throwable/shootable item on an object which is located in the direction in which the throwable item is to be thrown (i.e., a projectile) or shot is determined based on correspondence information defining which item will be effective on which object on an item-by-item basis, and an aiming point is displayed in different display modes depending on the result of the determination. As a result, the player is enabled to recognize whether the throwable item will be effective on the object before actually throwing the item.

Although the preceding discussion illustrates an example where the first display mode and the second display mode of an aiming point is distinguishable by its shape, the implementation disclosed herein is not limited thereto. The display mode of the aiming point may be varied in any other manner, e.g., based on color differences or differences in flickering frequency, so long as the first display mode can be distinguished from the second display mode.

Although the present embodiment illustrates an example where an aiming point is displayed by appropriately updating the game image data which has once been written to the color buffer 203, the present invention is not limited thereto. For example, the aim object may be placed in the game space, and an aiming point may be displayed as a function of the rendering of the aim object.

Although the preceding discussion illustrates an example where the effectiveness of a throwable item on a target object is determined based on a throwing/shooting range of the throwable item, the effective range of each item may be set in any arbitrary manner other than a throwing/shooting range. For example, the effective range of a boomerang item may be set to be any region lying above the player object.

Although the preceding discussion illustrates an application to throwable items, e.g., a rope, a hook, or a boomerang, the exemplary implementation disclosed herein is also applicable to items or projectile that are launched or shot, e.g., from a gun or other device.

While one or more exemplary non-limiting implementations are described in detail herein, the foregoing description is in all aspects illustrative and not restrictive. It is understood that numerous other modifications and variations may be devised without departing from the scope of the.

What is claimed is:

1. In a video-graphics game apparatus having a game operations controller capable of being manipulated by a human operator for displaying an aiming point on a game display screen, the aiming point being of use when an item used as a projectile in a game is targeted at a displayed object in a virtual 3-D game space, a method for controlling a projectile used in a game comprising:

displaying virtual three-dimensional game space having a plurality of objects and items, the plurality of objects including at least one player object;

selecting, in accordance with an operation made using the controller, one of a plurality of displayed items which are accessible to the player object as throwable items and specifying as a target object an object existing in a direction in which the throwable item is to be thrown;

storing correspondence information defining which throwable item is effective on which object on an item-by-item basis;

determining an effectiveness of a selected throwable item upon the target object based on the correspondence information; and generating aiming point data for displaying an aiming point indicating the direction in which the throwable item is to be thrown, the aiming point being displayed in a manner that is varied depending on a determination of the effectiveness of the throwable item;

wherein said plurality of objects and items are displayed on the game display screen as three-dimensional images and the aiming point is displayed so as to overlap the target object based on the aiming point data and, thereafter, the throwable item appears thrown at the aiming point in response to another operation made using the controller.

2. The method according to claim 1, wherein, one or more transparent objects are provided during gameplay in a neighborhood of at least one non-transparent object in the three-dimensional game space displayed on the game screen, the transparent object being visually unrecognizable;

one of the transparent objects that is located in a direction in which the throwable item is to be thrown is specified as the target object, and the storing correspondence information includes storing correspondence information defining which throwable item is effective on which transparent object on an item-by-item basis.

3. The method according to claim 1, further comprising positional computing a positional relationship between the player object and the target object, wherein a throw effectiveness is determined based on stored correspondence information and a predetermined effective range assigned to each item and said computed positional relationship.

4. The method according to claim 3 wherein, said computed positional relationship includes computing a distance from the player object to the target object, and said throwable item effectiveness determination is based on the correspondence information as well as a pre-defined shooting range assigned to each throwable item and the computed positional relationship.

5. The method according to claim 1, further comprising marking a target object in response to an operation made using the controller if the selected item is determined as being effective on the target object, wherein a trajectory of the throwable item is set so that the throwable item hits target object so marked.

6. The method according to claim 5 wherein if a plurality of target objects are marked, the trajectory of the throwable item is automatically controlled so that the throwable item hits all marked target objects.

7. In a game apparatus which displays an aiming point on a game display screen, the aiming point being of use when an item in a game is thrown or shot at an object in a game space, said game apparatus having a game operation controller and a data storage memory for storing correspondence information defining which throwable item is effective on which object on an item-by-item basis, a game program product embodied on a computer-readable medium for distribution and/or storage having stored thereon a game program to be executed by a computer of said game apparatus, comprising:

program instruction means for deploying in a three-dimensional space a plurality of objects to be displayed, the plurality of objects including a player object;

program instruction means for selecting, in accordance with an operation made using the controller, one of a plurality of items which are accessible to the player object as throwable items;

program instruction means for specifying as a target object an object existing in a direction in which the throwable item is to be thrown;

program instruction means for determining an effectiveness of the throwable item on the target object based on the correspondence information;

program instruction means for generating aiming point data to be used for displaying an aiming point indicating the direction in which the throwable item is to be thrown, the aiming point being displayed in a display mode which is varied depending on a determination result by the determination step; and program instruction means for performing display control so that the plurality of objects deployed in the object deployment step are displayed on the game screen as three-dimensional images, the aiming point is displayed so as to overlap the target object based on the aiming point data, and thereafter the throwable item appears thrown at the aiming point in response to an operation made using the controller.

8. The game program product according to claim 7 further comprising:

program instruction means for placing a transparent object in a neighborhood of at least one object in the game space displayed on the game screen, the transparent object being visually unrecognizable to the player;

program instruction means for specifying a target which specifies as the target object one of the transparent objects that is located in the direction in which the throwable item is to be thrown, and program instruction means for storing correspondence information defining which throwable item is effective on which transparent object on an item-by-item basis.

9. The game program product according to claim 7, further comprising:

program instruction means for computing a positional relationship between the player object and the target object, and program instruction means for determining an effectiveness of throwing an item based on the correspondence information as well as an effective range which is defined for each item and a computation of the positional relationship.

10. The game program product according to claim 9, further comprising:

program instruction means for computing a distance from the player object to the target object, and program instruction means for determining an effectiveness of throwing an item based on the correspondence information as well as a shooting range which is defined for each item and the computation of the positional relationship.

11. The game program product according to claim 7, further comprising:

program instruction means for marking the target object in response to an operation made by an operator using the controller if the throwable item is determined as being effective against the target object, wherein a trajectory of the throwable item is automatically controlled so that the throwable item hits the target object as marked by the marking step.

12. The game program product according to claim 11, wherein, if a plurality of target objects are marked, the trajectory of the throwable item is set so that the throwable item hits all of the marked target objects.

13. In a video game apparatus, a method for controlling a throwing or shooting of a displayed projectile item used against a targeted game object, comprising:

storing correspondence information between one or more projectile items and game objects defining which projectile item is effective upon which game object;

determining an effectiveness of throwing/shooting a particular projectile item during game play based on stored correspondence information; and displaying an aiming point on a game display, wherein the aiming point is varied in appearance depending upon a determined effectiveness for the particular projectile item, and wherein a predetermined displayed appearance of the aiming point is indicative that a targeted game object will be hit by the projectile object upon initiating a throwing or shooting action during gameplay.

* * * * *